(12) United States Patent
Ashby et al.

(10) Patent No.: US 10,908,101 B2
(45) Date of Patent: Feb. 2, 2021

(54) SYSTEM AND METHOD FOR ANALYZING SUBSURFACE CORE SAMPLES

(71) Applicant: Core Laboratories LP, Houston, TX (US)

(72) Inventors: Jason Michael Ashby, Magnolia, TX (US); William Allen Wells, Jr., Spring, TX (US)

(73) Assignee: Core Laboratories LP, Houston, TX (US)

( * ) Notice: Subject to any disclaimer, the term of this patent is extended or adjusted under 35 U.S.C. 154(b) by 18 days.

(21) Appl. No.: 16/193,690

(22) Filed: Nov. 16, 2018

(65) Prior Publication Data
US 2020/0158666 A1    May 21, 2020

(51) Int. Cl.
| | | |
|---|---|---|
| *G01N 23/203* | (2006.01) | |
| *G01N 23/22* | (2018.01) | |
| *G01N 23/223* | (2006.01) | |
| *G01V 5/04* | (2006.01) | |
| *G01V 5/12* | (2006.01) | |
| *G01N 23/20008* | (2018.01) | |
| *G01N 23/20066* | (2018.01) | |
| *G01V 5/00* | (2006.01) | |
| *G01N 23/20* | (2018.01) | |

(52) U.S. Cl.
CPC ........... *G01N 23/203* (2013.01); *G01N 23/20* (2013.01); *G01N 23/20008* (2013.01); *G01N 23/20066* (2013.01); *G01N 23/22* (2013.01); *G01N 23/223* (2013.01); *G01V 5/0016* (2013.01); *G01V 5/0025* (2013.01); *G01V 5/0041* (2013.01); *G01V 5/0066* (2013.01); *G01V 5/04* (2013.01); *G01V 5/12* (2013.01); *G01V 5/125* (2013.01)

(58) Field of Classification Search
CPC ............. G01N 23/20; G01N 23/20008; G01N 23/20066; G01N 23/203; G01N 23/22; G01N 23/223; G01V 5/0016; G01V 5/0025; G01V 5/0041; G01V 5/0066; G01V 5/04; G01V 5/12; G01V 5/125
USPC ................................................ 378/86, 88–90
See application file for complete search history.

(56) References Cited

U.S. PATENT DOCUMENTS

| | | | | |
|---|---|---|---|---|
| 4,297,575 A | * | 10/1981 | Smith, Jr. | ............... G01V 5/125 250/265 |
| 4,415,804 A | * | 11/1983 | Sowerby | .................. G01V 5/00 250/255 |
| 4,529,877 A | * | 7/1985 | Arnold | ..................... G01V 5/12 250/256 |
| 4,879,463 A | | 11/1989 | Wraight et al. | |
| 5,077,771 A | | 12/1991 | Skillicorn et al. | |

(Continued)

FOREIGN PATENT DOCUMENTS

| | | |
|---|---|---|
| WO | 2016146989 A1 | 9/2016 |
| WO | 2017219090 A1 | 12/2017 |

*Primary Examiner* — Allen C. Ho
(74) *Attorney, Agent, or Firm* — Fletcher Yoder, P.C.

(57) ABSTRACT

The present disclosure includes a core sample analysis system that includes a portable sampling device configured to be positioned adjacent to a subsurface core sample. The portable sampling device includes a first module that includes a radiation source. Also, the portable sampling device includes a second module that includes a detector that is configured to detect radiation emitted from the radiation source that reflects off of the subsurface core sample.

20 Claims, 7 Drawing Sheets

(56) References Cited

U.S. PATENT DOCUMENTS

| | | | | |
|---|---|---|---|---|
| 5,205,167 | A * | 4/1993 | Gartner | G01V 5/12 73/152.14 |
| 5,334,847 | A * | 8/1994 | Kronberg | G21F 1/125 250/506.1 |
| 5,440,118 | A | 8/1995 | Roscoe | |
| 5,608,215 | A | 3/1997 | Evans | |
| 5,804,820 | A | 9/1998 | Evans et al. | |
| 5,825,024 | A | 10/1998 | Badruzzaman | |
| 5,847,384 | A * | 12/1998 | Mathis | G01V 5/12 250/269.3 |
| 5,912,460 | A * | 6/1999 | Stoller | G01V 5/125 250/269.3 |
| 5,984,023 | A | 11/1999 | Sharma et al. | |
| 6,097,785 | A * | 8/2000 | Elam | G01N 23/223 250/253 |
| 6,220,371 | B1 | 4/2001 | Sharma et al. | |
| 6,275,563 | B1 | 8/2001 | Griffin, Jr. | |
| 6,552,333 | B1 * | 4/2003 | Storm | G01V 5/12 250/265 |
| 6,788,066 | B2 | 9/2004 | Wisler et al. | |
| 7,064,336 | B2 * | 6/2006 | Archer | G01T 7/00 250/370.09 |
| 7,064,337 | B2 * | 6/2006 | Rowland | G01T 1/244 250/370.03 |
| 7,082,185 | B2 * | 7/2006 | Freifeld | G01N 23/04 250/255 |
| 7,500,388 | B2 | 3/2009 | Fujisawa et al. | |
| 7,564,948 | B2 * | 7/2009 | Wraight | H01J 35/06 378/101 |
| 7,573,027 | B2 * | 8/2009 | Huiszoon | G01V 5/125 250/269.1 |
| 7,596,452 | B2 * | 9/2009 | Madigan | E21B 47/085 702/8 |
| 7,642,507 | B2 * | 1/2010 | Radtke | G01V 5/145 250/256 |
| 7,769,131 | B2 * | 8/2010 | Wallace | G01N 23/203 378/54 |
| 7,818,128 | B2 * | 10/2010 | Zhou | G01V 5/12 702/8 |
| 8,173,953 | B2 * | 5/2012 | Stoller | G01T 1/40 250/262 |
| 8,431,885 | B2 * | 4/2013 | Roscoe | G01V 5/101 250/269.3 |
| 8,455,812 | B2 * | 6/2013 | Nikitin | G01V 5/04 250/256 |
| 8,536,517 | B2 * | 9/2013 | Berheide | G01V 5/04 250/252.1 |
| 8,739,899 | B2 * | 6/2014 | Kumar | E21B 25/00 175/58 |
| 8,742,328 | B2 * | 6/2014 | Simon | G01V 5/125 250/254 |
| 9,448,189 | B2 * | 9/2016 | Korkin | G01N 23/12 |
| 9,507,047 | B1 * | 11/2016 | Dvorkin | G01V 5/101 |
| 9,535,017 | B2 * | 1/2017 | Paulus | G01N 23/203 |
| 9,535,177 | B2 * | 1/2017 | Ramsden | G01T 1/40 |
| 9,541,670 | B2 * | 1/2017 | Groves | E21B 49/06 |
| 9,759,834 | B2 * | 9/2017 | Lee | G01V 5/125 |
| 9,842,431 | B2 | 12/2017 | Caliskan et al. | |
| 9,880,115 | B2 * | 1/2018 | Paulus | G01N 23/203 |
| 10,197,701 | B2 * | 2/2019 | Stewart | G01V 5/045 |
| 10,281,610 | B2 * | 5/2019 | Tkabladze | G01V 5/12 |
| 10,301,934 | B2 * | 5/2019 | Brady | E21B 47/10 |
| 10,401,530 | B2 * | 9/2019 | Pereira | G01V 5/125 |
| 10,416,342 | B2 * | 9/2019 | Scoullar | G01V 5/0041 |
| 10,459,112 | B2 * | 10/2019 | Hu | G01V 5/12 |
| 10,481,113 | B2 * | 11/2019 | Arodzero | G01N 23/203 |
| 2004/0217296 | A1 | 11/2004 | Rowland et al. | |
| 2004/0218716 | A1 | 11/2004 | Freifeld et al. | |
| 2005/0023477 | A1 | 2/2005 | Archer et al. | |
| 2006/0097171 | A1 | 5/2006 | Balchunas et al. | |
| 2006/0192096 | A1 | 8/2006 | Radtke et al. | |
| 2008/0156975 | A1 | 7/2008 | Kieschnick | |
| 2010/0243877 | A1 | 9/2010 | Berheide et al. | |
| 2011/0042143 | A1 | 2/2011 | Auranen et al. | |
| 2012/0012392 | A1 | 1/2012 | Kumar | |
| 2013/0308753 | A1 | 11/2013 | Groves et al. | |
| 2014/0355737 | A1 | 12/2014 | Korkin et al. | |
| 2015/0268178 | A1 | 9/2015 | Smith et al. | |
| 2015/0316665 | A1 | 11/2015 | Ramsden | |

* cited by examiner

SYSTEM AND METHOD FOR ANALYZING SUBSURFACE CORE SAMPLES

BACKGROUND

The present disclosure relates generally to analyzing subsurface core samples. More specifically, the present disclosure relates to a portable device that may be used for analyzing subsurface core samples.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The oil and gas industry frequently performs offshore drilling operations. Offshore drilling is a process where a borehole, a small diameter hole in the ground, is drilled through the seabed or the Earth's surface in order to explore and extract petroleum that lies beneath the seabed or surface. The offshore drilling process generally takes place from an offshore oil platform. An offshore oil platform, or oil rig, is a large structure with facilities to drill wells, to extract and process oil and natural gas, and to temporarily store product until it can be brought to shore for refining. During the offshore drilling process, subsurface samples, or samples from beneath the seabed, may be retrieved and analyzed to determine characteristics, such as porosity (i.e., the capacity of the rock to hold fluids) or permeability (i.e., the ease by which a fluid can flow through the reservoir rock), of the surrounding area.

The subsurface samples are often retrieved in a long (e.g., 120-240 feet) cylinder known as a core. The core is then cut or sawed into core sections (e.g., 3 feet long). Once a core section is obtained, the ends of the core section are capped, and the core sections may placed in a safe for transport, for example, to a laboratory where the core may be analyzed. During transportation, the core samples may be subject to shocks, vibrations, extreme temperatures, contamination, and similar handling issues. As some core samples may be fragile and delicate, such handling may result in physical changes to the core sample that may cause the analysis of the core sample to be adversely affected. Moreover, extended periods of time, such as days, weeks, or months, may pass before core samples can be delivered to a laboratory and analyzed. Accordingly, there exists a need for techniques for analyzing core samples quickly, such as at the wellsite from which the core samples originate.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a core sample analysis system includes a portable sampling device configured to be positioned adjacent to a subsurface core sample. The portable sampling device includes a first module that includes a radiation source. Also, the portable sampling device includes a second module that includes a detector that is configured to detect radiation emitted from the radiation source that reflects off of the subsurface core sample.

In another embodiment, a portable apparatus includes a density module that includes a radiation source. The portable apparatus also includes a detector module coupled to the density module, and the detector module includes a detector that is configured to detect radiation emitted from the radiation source that reflects off of a subsurface core sample.

In a further embodiment, a method for analyzing a subsurface core sample includes emitting, via a radiation source disposed on a side of the subsurface sample, radiation into the subsurface core sample. The method also includes collecting, via a detector disposed on the side of the subsurface sample, data indicative of radiation from the radiation source that reflects off of the subsurface core sample. Additionally, the method includes analyzing, via processing circuitry, the collected data.

DRAWINGS

These and other features, aspects, and advantages of the present disclosure will become better understood when the following detailed description is read with reference to the accompanying drawings in which like characters represent like parts throughout the drawings, wherein.

Figure 10:
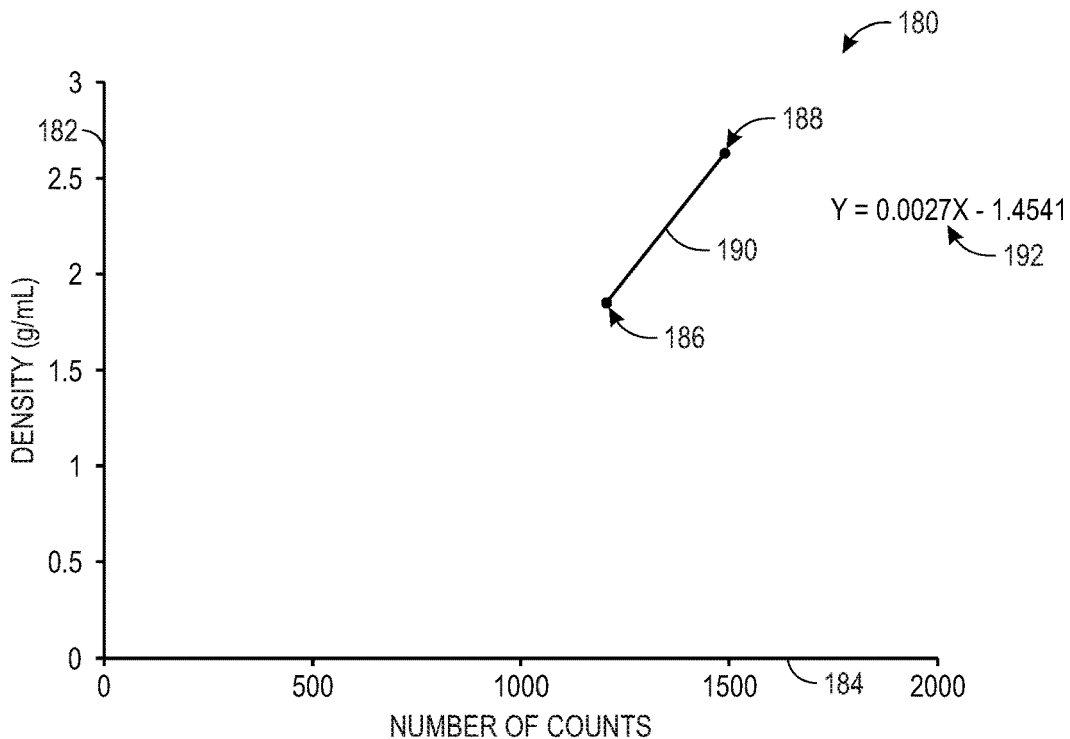
Figure 11:
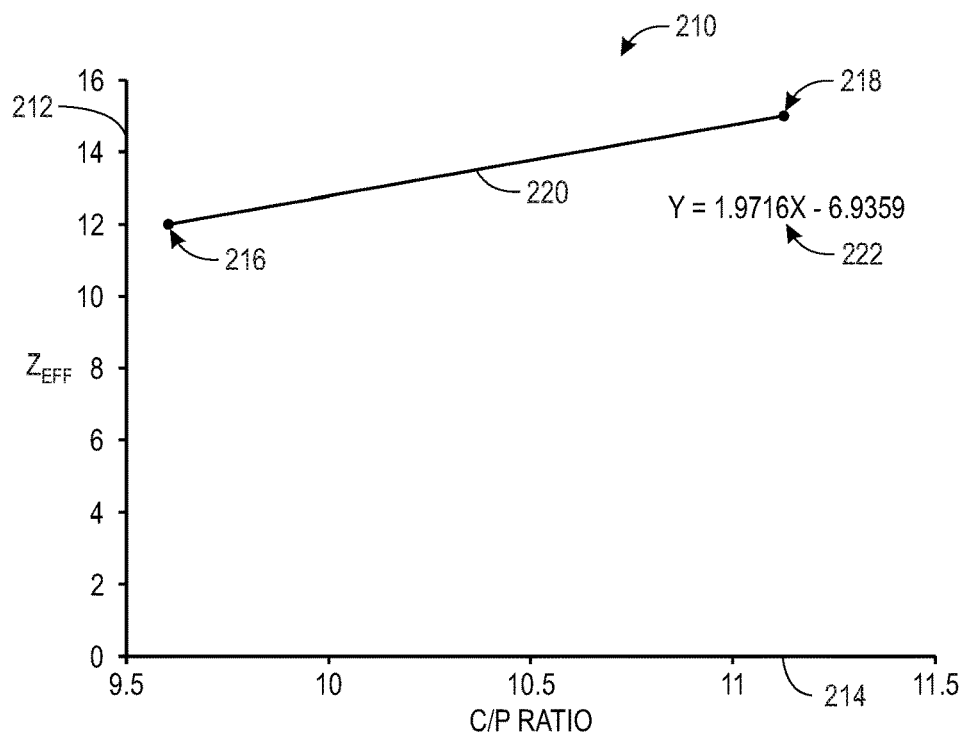

FIG. 10 is a graph of data collected by the core sample analysis system, showing density versus number of counts per second, in accordance with aspects of the present disclosure; and FIG. 11 is a graph of data collected by the core sample analysis system, showing effective nuclear charge as a function of a ratio of the number of counts associated a Compton scattering range to the number of counts associated with a photoelectric absorption region, in accordance with aspects of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with systems-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more elements. The terms "comprising," "including," and "having" are intended to be inclusive and mean that there may be additional elements other than the listed elements.

Embodiments of the present disclosure are directed toward a portable device or system that may be used to analyze core samples at a wellsite, laboratory, or another desired location. More specifically, the portable device includes a gamma ray detector (e.g., a scintillometer) that is mounted onto a skate that may engage a core barrel (e.g., that surrounds a core sample). A detachable gamma ray source may be coupled to a side of casing that encloses the gamma ray detector, and the gamma ray detector may detect gamma rays reflected off of and emitted from the core sample.

Figure 1:
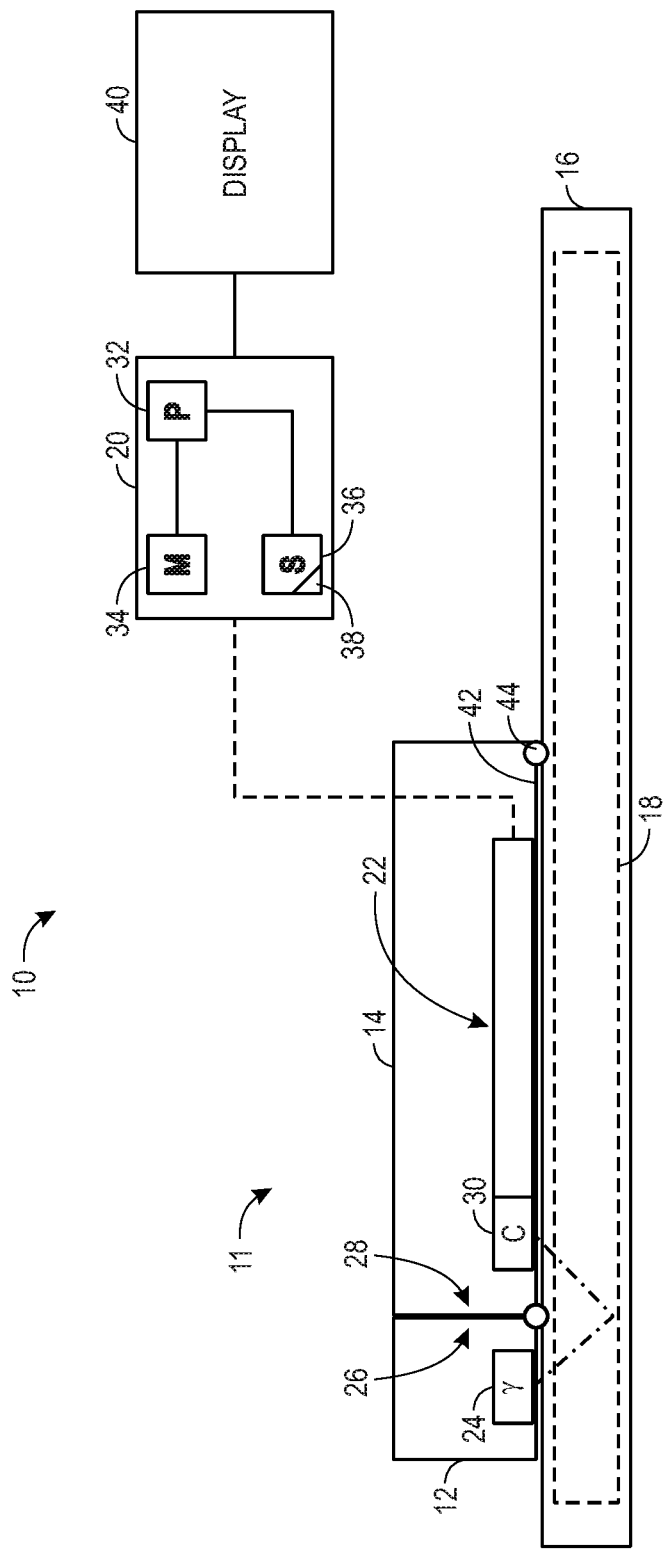
FIG. 1 is a front view of a schematic diagram of an embodiment of a core sample analysis system, in accordance with aspects of the present disclosure.

Turning to the drawings, FIG. 1 is a front view of a schematic diagram of an embodiment of a core sample analysis system 10. As illustrated, the core sample analysis system 10 includes portable sampling device 11 that includes a density module 12 and a detector module 14 that are positioned on top of a core barrel 16 that includes a core sample 18. As additionally illustrated, the core sample analysis system 10 also includes a data analysis module 20. As described below, the density module 12 may provide gamma radiation to the core sample 18, and gamma radiation from the core sample 18 may be detected by a detector 22 housed within the detector module 14. Data collected by the detector 22 may be analyzed to make determinations regarding several properties of the core sample 18, such as, but not limited to, density and effective nuclear charge ($Z_{eff}$) associated with various portions of the core sample 18.

As mentioned above, the density module 12 includes the radiation source 24. The radiation source 24 may include any element or compound suitable for providing gamma radiation, such as, but not limited to, cobalt-60 (Co-60) and cesium-137 (Cs-137). Generally speaking, the radiation source 24 provides gamma radiation that may cause the core sample 18 to emit gamma radiation that may be detected by the detector 22. More specifically, the core sample 18 may absorb energy from the gamma radiation provided by the radiation source 24, which may cause nuclei of the core sample 18 to enter an excited, or high energy, state. As the nuclei enter less excited states, such as a ground state, gamma radiation may be emitted from the core sample 18, which may be detected by the detector 22. Additionally, gamma radiation from the radiation source 24 may be reflected off of the core sample 18 and detected by the detector 22. In other words, the detector 22 may detect radiation from the radiation source 24 that is reflected off of the core sample 18, as well as detect radiation emitted from the core sample 18.

Furthermore, as illustrated, the density module 12 may be directly coupled to the detector module 14. For example, a face 26 of the density module 12 may directly contact a face 28 of the detector module 14. The density module 12 and the detector module 14 may be coupled to one another via various mechanical methods, such as via fasteners, bolts, screws, and the like. When coupled to one another, the density module 12 and detector module 14 may be spaced to enhance the likelihood of radiation detection from the core sample 18 by the detector 22. For example, in one embodiment, when coupled to one another, the detector module 14 and density module 12 may maintain a certain distance apart from one another so that radiation is detected by the detector 22. Additionally, it should be noted that, in other embodiments, the density module 12 and the detector module 14 may be included within a single module. In other words, the density module 12 and the detector module 14 may be contained in a common housing.

While the density module 12 and components thereof are discussed in greater detail below, it should be noted that the density module 12 may be constructed from lead or any other material that provides radiation shielding. For example, in order to ensure that gamma radiation from the radiation source 24 does not directly interact with the detector 22, materials such as lead may be employed. As will also be discussed below, lead may also be provided within the detector module 14 to provide additional radiation shielding for the detector 22. By shielding the detector 22 from direct radiation directly from the radiation source 24, more accurate data (e.g., data indicative of gamma rays emitted by the core sample 18) may be obtained compared to embodiments that do not include radiation shielding materials. Furthermore, while the density module 12 has been described as being made from lead, it should be noted that, in other embodiments, different materials may be used. For example, the density module 12 may be made from bismuth, gold, tungsten, iron, copper, or any other material that may provide suitable radiation shielding.

The detector module 14, as illustrated, includes the detector 22. The detector 22 may be any suitable detector that is configured to detect gamma radiation. Furthermore, in embodiments in which a type of radiation other than gamma radiation is employed, the detector 22 may be configured to detect the other type of the radiation. In the illustrated embodiment, the detector 22 is a gamma ray scintillator (e.g., scintillation detector) that includes a crystal 30. The crystal 30, which may include one or more scintillation crystals, emit light when gamma rays interact with the atoms in the crystal 30. For example, the crystal 30 may be a thallium-doped sodium iodide scintillation crystal, which may also be referred to as a sodium iodide crystal or NaI crystal. The intensity of the light produced may be proportional to the energy deposited in the crystal by the gamma ray. That is, the more gamma radiation the crystal 30 receives, the more intense the light the scintillator produces will be. The detector 22 may include a photocathode that converts the light into electrons. A signal (e.g., resulting from electron cascades) may be generated within the detector 22 (e.g., as the electrons travel from one end of a photomultiplier tube within the detector 22 to another end of the photomultiplier tube) in response to the light emitted from the crystal 30. As discussed below, the data analysis module 20 may receive and process signals generated by the detector 22.

The detector module 14 may be generally rectangular prismatic in shape and may be made from a variety of suitable materials, such as various types of metals. For instance, the detector module 14 may be made from stainless steel or aluminum, in some embodiments. However, it should be noted that, in other embodiments, the detector module 14 may be made from other metallic materials or even non-metallic materials, such as plastic or wood. Furthermore, it should be noted that, as discussed below, one or more faces 28 (or portions thereof) of the detector module 14 may be removable from the rest of the detector module 14.

The data analysis module 20 may be communicatively coupled to the detector 22 and may receive data from the detector 22 regarding gamma radiation from the core sample 18 that is detected by the detector 22. As illustrated, the data analysis module 20 includes processing circuitry 32, memory 34, and storage 36. The processing circuitry 32 processes the data from the detector 22. More specifically, the processing circuitry 32 may include any suitable data processing circuitry to process data received from the detector 22, such as one or more microprocessors, programmable logic devices (PLDs), application-specific integrated circuits (ASICs), or a combination thereof. The processing circuitry 32 may execute instructions stored on the memory 34 and the storage 36. For instance, the storage 36, which may include read only memory (ROM), rewritable non-volatile memory such as flash memory, hard drives, optical discs, or the like, may include an application 38 that the processing circuitry 32 may execute in order to process data received from the detector 22. In other embodiments, the memory 34, which may include random access memory (RAM), may include the application 38. Furthermore, the data analysis module 20 may be communicatively coupled to a display 40, which may display the data, or a representation of the data, collected by the detector 22, as well as any analysis of the data conducted by the data analysis module 20. As discussed below, the data analysis module 20 may determine a density, as well as the effective nuclear charge ($Z_{eff}$), of the core sample 18 or of portions thereof.

Figure 2:
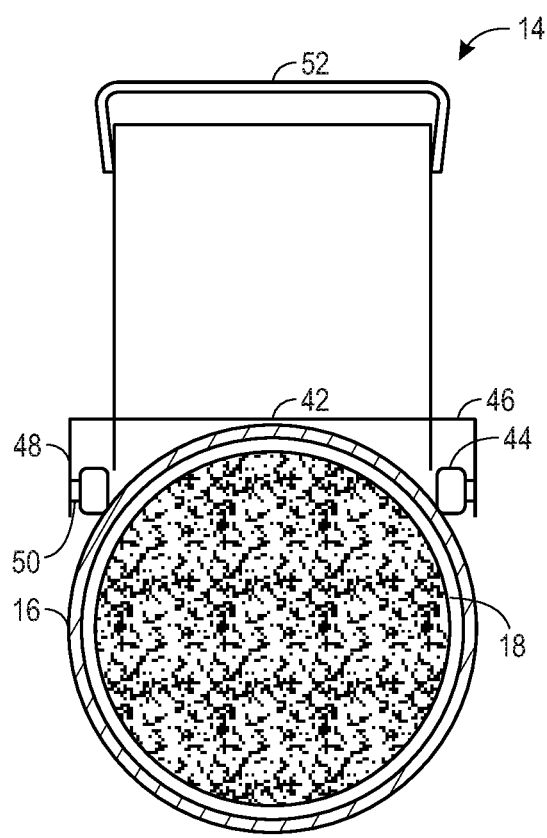
FIG. 2 is an axial view of an embodiment of the core sample analysis system, illustrating a detector module and skate, in accordance with aspects of the present disclosure.

The detector module 14 and the density module 12 may be disposed on top of a skate 42 that enables the detector module 14 and density module 12 to move along a length of the of the core sample 18, such as via rollers 44. For example, FIG. 2 illustrates is an axial view of the detector module 14 and skate 42 disposed on top of the core barrel 16 and core sample 18. In operation, rollers 44 of the skate 42 may contact the outer surface of the core barrel 16 to enable the skate 42 to be moved along the core barrel 16 so that data regarding the core sample 18 can be collected. The rollers 44 may be coupled to the skate 42 via L-shaped brackets 46 that are coupled to the skate 42. More specifically, the rollers 44 may be coupled to vertical portions 48 of the L-shaped brackets 46, for example, via screws or bolts. Additionally, the rollers 44 may be separated from the vertical portions 48 of the L-shaped brackets 46 via one or more spacers 50, which may include washers, thrust bearings, or a combination thereof. In addition to enabling the skate 42 to traverse the core barrel 16, the rollers 44 enable the skate 42 (and detector module 14 and density module 12) to maintain a close distance (e.g., within one inch) to the surface of the core barrel 16, as well as stabilize the skate 42, density module 12, and detector module 14 on the core barrel 16. In operation, the detector module 14 sits atop the core sample 18. The detector module 14 may be held in place relative to the core sample 18 via the rollers 44 and the L-shaped brackets 46. Data may be collected at one portion of the core sample 18, the detector module 14 may be moved, and more data may be collected from the core sample 18. For example, a user may push or pull the detector module 14 via a handle 52 that may be coupled to the detector module 14 via welding or fasteners.

Figure 3:
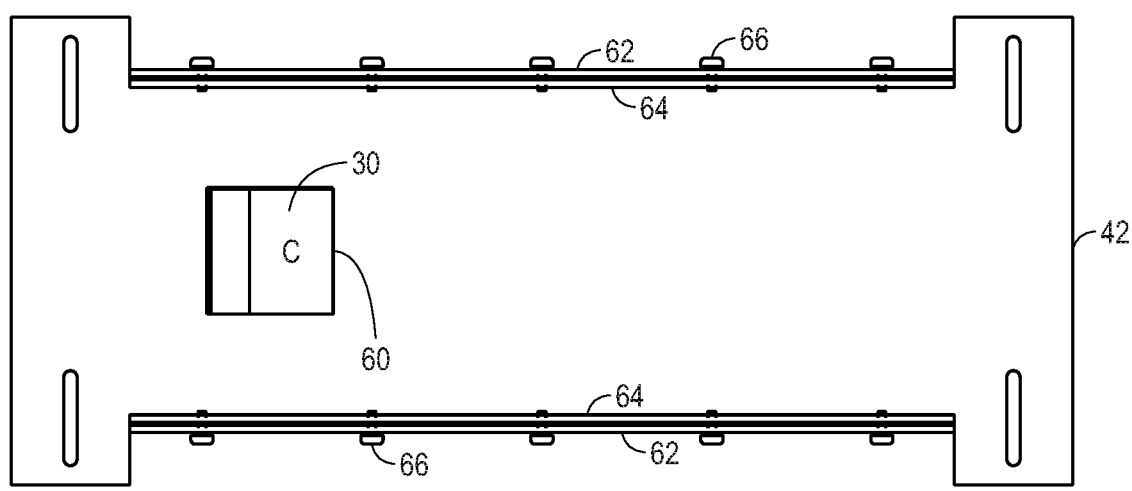
FIG. 3 is a bottom view of an embodiment of a detector module and skate of the core sample analysis system, in accordance with aspects of the present disclosure.

Referring briefly back to FIG. 1, as the skate 42 and detector module 14 move along the core barrel 16, the detector 22 may collect data regarding the core sample 18. For example, as described above, the detector 22 may detect radiation from the core sample 18 (e.g., that results from being irradiated by the radiation source 24). With this in mind, FIG. 3 is a bottom view of the skate 42 and detector module 14. As illustrated, the skate 42 includes an opening 60 through which the crystal 30 of the detector 22 is exposed. Accordingly, as radiation is emitted from the core sample 18, the radiation may pass through the opening 60 and interact with the crystal 30 of the detector 22. Moreover, flanges 62 of the detector module 14 may be coupled to flanges 64 of the skate 42 via fasteners 66. Coupling the detector module 14 and skate 42 to one another enables the detector module 14 to be held in place securely, which may improve the accuracy of measurements collected via the detector 22.

Figure 4:
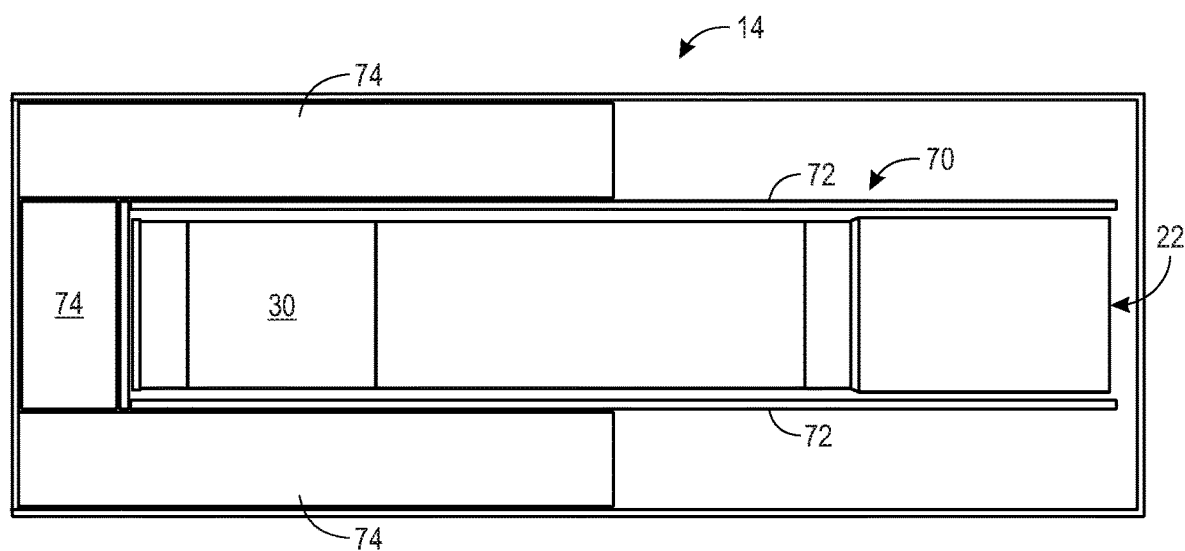
FIG. 4 is a top view of an embodiment of a detector module of the core sample analysis system, in accordance with aspects of the present disclosure.

Continuing with the drawings, FIG. 4 illustrates a top view of the detector module 14. The detector 22 may be held in place within the detector module 14 via a holder 70, which may be made from a metal material, such as stainless steel. The holder 70 may be of a width that is slightly larger than a width or diameter or the detector 22 such that the detector 22 may be situated between walls 72 of the holder 70 but unable to move (e.g., slide) or rotate on its own while disposed within the holder 70.

Furthermore, the detector module 14 may include material that provides radiation shielding. For instance, as illustrated, the detector module 14 includes a radioactive-shielding material 74, such as lead, that serves to shield the crystal 30 of the detector 22 from radiation directly from the radiation source 24. By shielding the crystal 30 from direct radiation emitted from the radiation source 24, the crystal 30 may better detect radiation reflected off of and/or emitted from the core sample 18. That is, because the crystal 30 is shielded from the radiation emitted directly by the radiation source 24, the detector 22 is more likely to only or substantially only detect radiation emitted from, or reflected off of, the core sample 18 (e.g., as a result of being irradiated by the radiation source 24).

Figure 5:
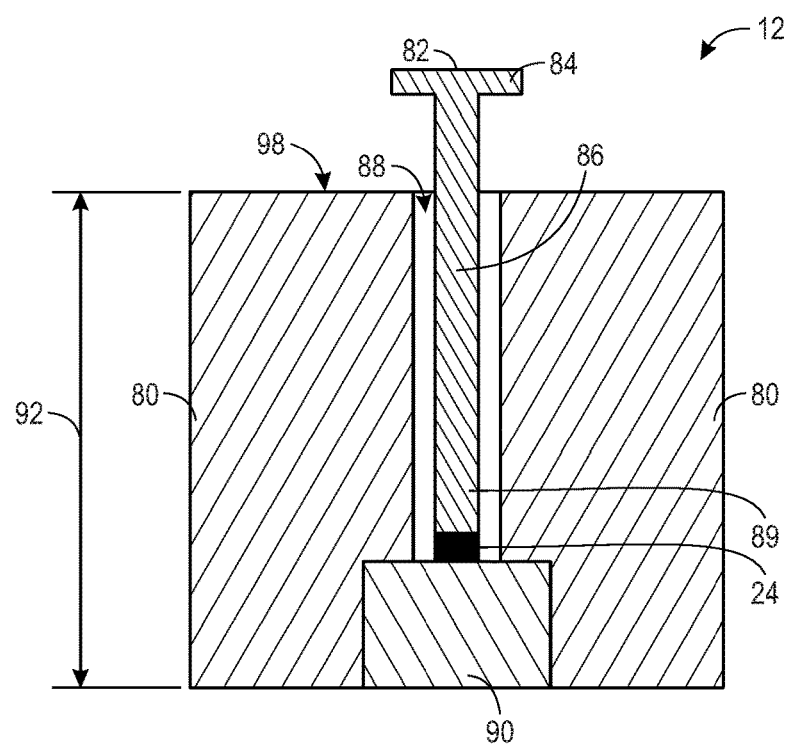
FIG. 5 is a axial cross-sectional view of an embodiment of a density module of the core sample analysis system, in accordance with aspects of the present disclosure.

Focusing the discussion now on the density module 12, FIG. 5 is an axial cross-sectional view of the density module 12. Before discussing the details of FIG. 5 though, it should be noted that portions of the density module 12 are omitted from FIG. 5 to increase clarity. In particular, and as described below, the density module 12 may include a channel 88 that extends through a height of the density module 12. The channel 88 may be surrounded by another material, such as lead. Accordingly, in FIG. 5, some of material that surrounds that channel 88 has been omitted to illustrate a cross-section of the channel 88 and components of the density module 12 associated therewith.

The density module 12 includes a body 80 that is made of a radiation-shielding material, such as lead. Constructing the body 80 of the density module 12 from a material that shields against radiation may enable the detector 22 to more accurately collect data. For instance, the radiation source 24 is included within density module 12. As described, the density module 12 and detector module 14 may be kept in close proximity (e.g., physical contact) to one another. Accordingly, the radiation source 24 may be relatively near the detector 22. By constructing the body 80 from a radiation-shielding material, radiation from the radiation source 24 may be blocked from direct detection by the detector 22.

Figure 6A:
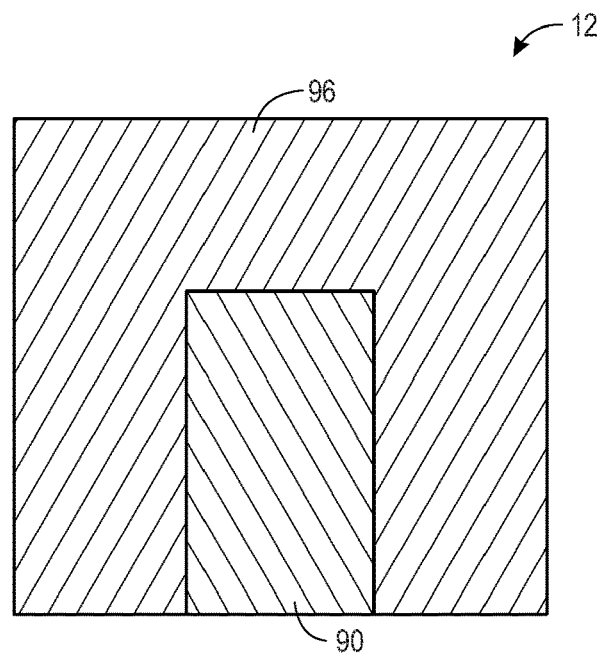
FIG. 6A is a bottom view of an embodiment of a density module of the core sample analysis system, illustrating a tab of the density module disposed within the density module, in accordance with aspects of the present disclosure.
Figure 6B:
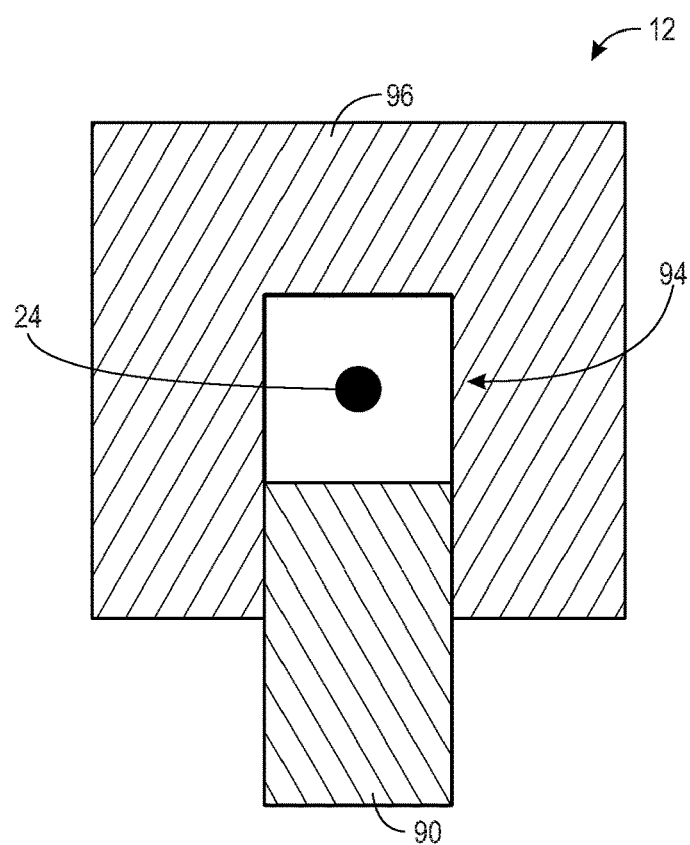
FIG. 6B is a bottom view of an embodiment of a density module of the core sample analysis system, illustrating a tab of the density module partially removed from the density module, in accordance with aspects of the present disclosure.

As additionally illustrated, the density module 12 includes a plunger 82 that has a handle 84 and shaft 86. The plunger 82 may be constructed from the same material as the body 80 or another material, such as stainless steel, wood, plastic, or another suitable material. The shaft 86 of the plunger 82 extends through a channel 88 formed in the body 80 of the density module 12. The radiation source 24, which may be coupled to an end 89 of the shaft 86, for example via an adhesive such as glue or epoxy, may abut a tab 90 that is made from a radiation-shielding material, such as lead. The tab 90 may be moved (e.g., pulled out of the body 80), such that the channel 88 extends an entire height 92 of the density module 12. For instance, FIG. 6A illustrates a bottom view of the density module 12 when the tab 90 is disposed within the density module 12, and FIG. 6B illustrates a bottom view of the density module 12 when the tab 90 has been partially removed from the body 80 of the density module 12. As illustrated, when the tab 90 is removed, there is an opening 94 in a bottom face 96 of the density module 12, which causes the channel 88 to extend through the body 80 by the entire height of the density module 12.

When the tab 90 is removed, or partially removed as shown in FIG. 6B, the plunger 82 and components thereof may also be moved. More specifically, referring back to FIG. 5, the handle 84, shaft 86, and radiation source 24 may descend until the handle 84 abuts a top surface 98 of the density module 12. In other words, the radiation source 24 may be lowered inside of the channel 88. The length of the shaft 86 may be selected such that the radiation source 24 is located at a desired position within the channel 88 when the handle 84 is lowered to abut the top surface 98 of the density module 12. For instance, the radiation source 24 may descend such that the radiation source 24 is still located within the channel 88 near the bottom face 96 of the density module 12.

Removing the tab 90 enables radiation from the radiation source 24 to interact with the core sample 18. For instance, referring briefly back to FIG. 1, radiation from the radiation source 24 may exit the density module 12 and be absorbed by, or reflected off of, the core sample 18. Referring back to FIG. 5, lowering the radiation source 24 within the channel 88 enables more radiation to reach the core sample 18, which may enhance the accuracy of the data collected by the detector 22 as well as the analysis of the data as performed by the data analysis module 20.

Figures 7, 8:
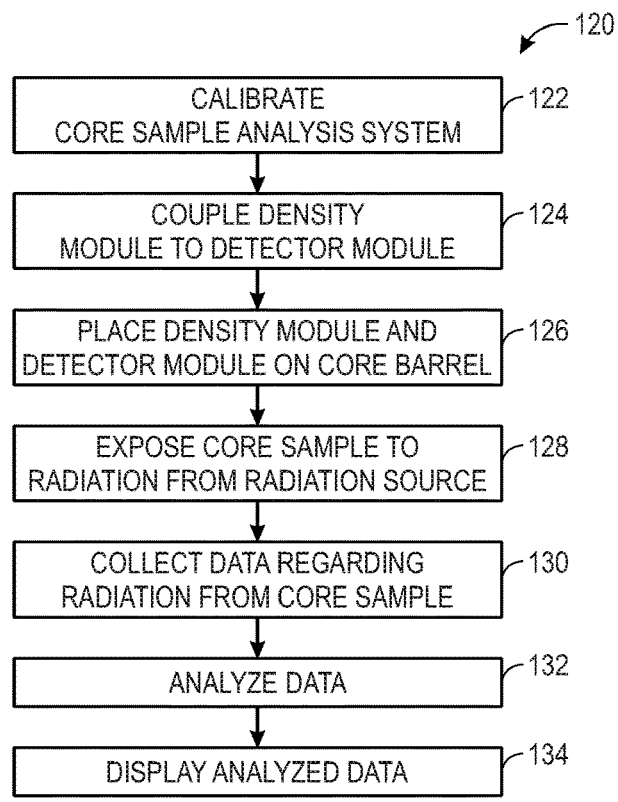
FIG. 7 is a flowchart of a process for analyzing core samples, in accordance with aspects of the present disclosure.
FIG. 8 is a table of raw data collected by the core sample analysis system, in accordance with aspects of the present disclosure.

Keeping the discussion of core sample analysis system 10 in mind, FIG. 7 is a flowchart of a process 120 for analyzing core samples, such as core sample 18. The process 120 may be implemented using the core sample analysis system 10. Before continuing to discuss the process 120, it should be noted that some steps of the process 120 discussed below may not be performed in each embodiment of the process 120. Indeed, other embodiments of the process 120 may include fewer or additional steps than those shown in FIG. 7.

At process block 122, the core sample analysis system 10 may be calibrated. Calibrating the core sample analysis system 10 may include adjusting a setting associated with the detector 22 until a peak associated with the radiation source 24 is associated with a specific data channel or a data channel approximately equal to the specific data channel. For instance, FIG. 8 illustrates a table 140 that is indicative of raw data collected by the detector 22. For example, the detector 22 may collect data of radiation when there is no core sample 18 disposed within the core barrel 16. In particular, FIG. 8 includes a first column 142 of channels and a second column 144 of counts per second of radiation detected by the detector 22 during a time associated with each channel. A higher number of counts per second is indicative of a greater amount of radiation detected by the detector 22. Each of the channels may be associated with a different energy level (e.g., an energy level in kiloelectron volts (keV)). Furthermore, the table 140 includes data for 1024 channels, signifying that the detector 22 detects radiation associated with 1024 energy levels. Depending on the embodiment of the detector 22 utilized, fewer or more than 1024 channels may be utilized.

Figure 9:
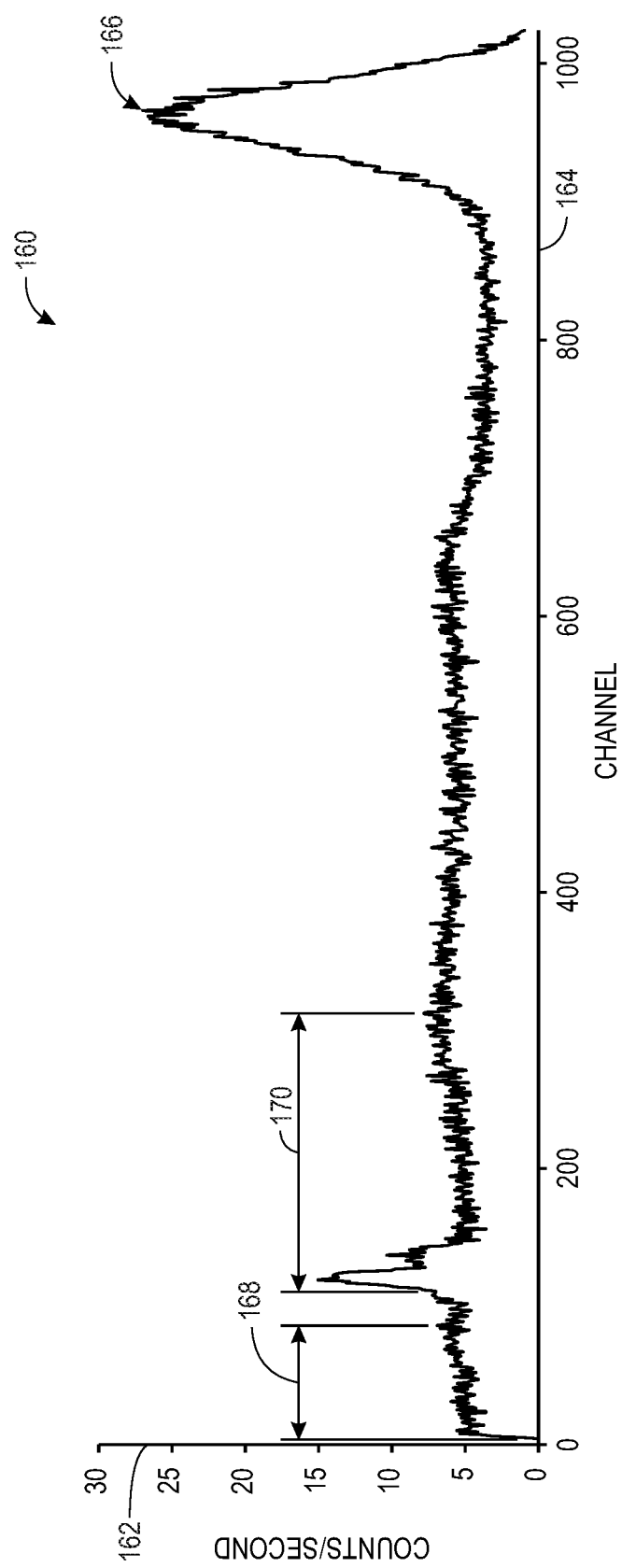
FIG. 9 is a graph of data collected by the core sample analysis system, showing number of counts per second versus channel number, in accordance with aspects of the present disclosure.

FIG. 9 illustrates a graph 160 representing data collected by the detector 22, where the data is shown as number of counts per second (e.g., as indicated by a first axis 162) versus channel number (e.g., as indicated by a second axis 164). A peak 166, or the data point with the highest number of counts per second, may be associated with a particular channel. As part of the calibration of the core sample analysis system 10, it may be desirable for the peak 166 to be associated with a particular channel, or a channel approximately equal to the particular channel. For instance, the peak 166 may be associated with channel 950 or a channel close in value (e.g., within 10, 20, or 30 channels) to channel 950. Electrical settings associated with the detector may be adjusted (e.g., energy levels associated with each channel) until the peak 166 is associated with the desired channel, or a channel approximately equal to the desired channel. In particular, the desired channel may also be associated with a specific energy level. For instance, in the presently discussed embodiment, the energy level associated with the peak 166 may be approximately 660 keV.

Referring back to FIG. 7, calibration of the core sample analysis system 10 may also include collecting an inactive measurement, which refers to collected radiation data via the detector 22 when there is no core sample 18 disposed within the core barrel 16. For instance, after the peak 166 is associated with is associated with a desired channel, or a channel approximately equal to the desired channel, radiation data may be collected when no core sample 18 is included inside of the core barrel 16.

Calibration of the core sample analysis system 10 may also include collecting data for a material having a relatively low density and/or low effective nuclear charge. For instance, a material with a known density and effective nuclear charge may be placed within the core barrel 16. The material may be exposed to radiation from the radiation source 24, and the detector 22 may collect radiation as discussed above.

Similarly, calibration of the core sample analysis system 10 may include collecting data for a material with a relatively high density and/or high effective nuclear charge. For instance, a material with a known density and effective nuclear charge may be placed within the core barrel 16. The material may be exposed to radiation from the radiation source 24, and the detector 22 may collect radiation, as discussed above.

Based on the data associated with the inactive measurement, the measurement of the material of relatively low density and/or low effective nuclear charge, and/or the material having relatively high density and/or high effective nuclear charge, equations for density and effective nuclear charge may be determined. Referring back to FIG. 9, the data collected by the detector 22 may include two regions:

a photoelectric absorption region 168 and a Compton scattering region 170. Each of the photoelectric absorption region 168 and the Compton scattering region 170 may be associated with various energy levels and channels. At energy levels associated with the photoelectric absorption region 168, radiation from the radiation source 24 may be absorbed by atoms of the core sample 18 but are not typically reflected off of the core sample 18. The photoelectric absorption region 168 is directly related to the atomic number of the atoms in the portion of the core sample 18 exposed to the radiation from the radiation source 24. Moreover, as discussed below, the ratio of counts associated with the Compton scattering region 170 and the photoelectric absorption region 168 may be utilized to determine the effective nuclear charge of the core sample 18. The Compton scattering region 170 is associated with energy levels at which radiation from the radiation source 24 is reflected back into the detector 22. Density is directly related to the counts associated with the Compton scattering region 170. For instance, a higher number of counts detected by the detector 22 correlates with a greater density of the material being sampled.

The processing circuitry 32 may determine the number of counts (e.g., from the second column 144 of the table 140 of FIG. 8) associated with the channels included within the photoelectric absorption region 168 and the Compton scattering region 170 for each of the inactive measurement, the measurement of the material of relatively low density and/or low effective nuclear charge, and/or the material having relatively high density and/or high effective nuclear charge. In other words, the processing circuitry 32 may determine which channels are associated with the photoelectric absorption region 168 and the Compton scattering region 170, and the processing circuitry 32 may determine the sum of the counts associated with the photoelectric absorption region 168 and the Compton scattering region 170 for each of the inactive measurement, the measurement of the material of relatively low density and/or low effective nuclear charge, and/or the material having relatively high density and/or high effective nuclear charge. The processing circuitry 32 may subtract the number of counts associated with the inactive measurement from the number of counts associated with the photoelectric absorption region 168 and the Compton scattering region 170 for the material of relatively low density and/or low effective nuclear charge and the material having relatively high density and/or high effective nuclear charge.

To determine the equation for the density of a sample, the processing circuitry 32 may generate a graph. For instance, FIG. 10 illustrates a graph 180 of density (e.g., indicated in grams per milliliter on a first axis 182) versus the number of counts (e.g., indicated on a second axis 184) associated with the Compton scattering region 170 of the material of relatively low density and/or low effective nuclear charge and the material having relatively high density and/or high effective nuclear charge. In particular, a first data point 186 is associated with the material of a relatively low density and/or low effective nuclear charge and the number of counts associated with the low density and/or low effective nuclear charge material. A second data point 188 may be plotted at a position in the graph 180 at a position corresponding with the known density and the determined number of counts for the material of relatively high density and/or effective nuclear charge. The processing circuitry 32 may determine a line of best fit 190 between the first data point 186 and the second data point 188 and determine an equation 192 of the line of best fit 190. For instance, in FIG. 10, the equation 192 is: $y=0.0027x-1.4541$, where y is density, and x is the number of counts (e.g., the number of counts minus the counts for a material minus the number of counts determined during the inactive measurement). As described below, the processing circuitry 32 may utilize the equation 192 to determine the density of the core sample 18.

The processing circuitry 32 may also generate a graph utilized in the determination of the equation for effective nuclear charge. For example, FIG. 11 is a graph 210 of effective nuclear charge (e.g., indicated by a first axis 212) as a function of a ratio of the number of counts associated with the Compton scattering region 170 to the number of counts associated with the photoelectric absorption region 168 (e.g., indicated by a second axis 214). The graph 210 includes a first data point 216 associated with the effective nuclear change of the material of a relatively low density and/or low effective nuclear charge and the ratio of the number counts of associated with the Compton scattering region 170 to the number of counts associated with the photoelectric absorption region 168 for the relatively low density and/or low effective nuclear charge material. A second data point 218 may be plotted at a position in the graph 210 at a position corresponding with the known effective nuclear charge and the determined ratio of the number of counts associated with the Compton scattering region 170 to the number of counts associated with the photoelectric absorption region 168 for the relatively high density and/or high effective nuclear charge material. The processing circuitry 32 may determine a line of best fit 220 between the first data point 216 and the second data point 218 and determine an equation 222 of the line of best fit 220. The equation 222 defines effective nuclear charge as a function of the ratio of the number of counts associated with the Compton scattering region 170 to the number of counts associated with the photoelectric absorption region 168. For instance, in FIG. 11, the equation 222 is $y=1.9716x-6.9359$, where y is the effective nuclear charge, and x is the ratio of the number of counts associated with the Compton scattering region 170 to the number of counts associated with the photoelectric absorption region 168.

It should be noted that, in other embodiments, more than two materials may be used during the calibration of the core sample analysis system 10. For instance, data for three, four, five, or more samples with known densities and effective nuclear charges may be collected by the detector 22. The processing circuitry 32 may make the determinations discussed above with regard to the number of counts, plot points to a graph as discussed above, and generate a line of best fit for the points in order to determine equations for density as a function of the number of counts, as well as effective nuclear charge as a function of the ratio of the number of counts associated with the Compton scattering region 170 to the number of counts associated with the photoelectric absorption region 168. As described below, the processing circuitry 32 may utilize the equation 222 to determine the effective nuclear charge of the core sample 18.

Referring back to FIG. 7 and continuing with the discussion of the process 120, at process block 124, the density module 12 and detector module 14 may be coupled to one another. For example, as described above, fasteners may be employed to the coupled the density module 12 and detector module 14 to one another. The density module 12 and detector module 14 may also be placed on and coupled to the skate 42.

At process block 126, the density module 12 and detector module 14 may be placed onto the core barrel 16. The core sample 18 may also be loaded into the core barrel 16, if not already completed. At process block 128, the core sample 18 may be exposed to radiation from the radiation source 24. For instance, the tab 90 may be removed from the density module 12, the radiation source 24 may be lowered within the channel 88, and the core sample 18 disposed within the core barrel 16 may be exposed to the radiation from the radiation source 24.

At process block 130, the detector 22 may collect data regarding radiation from the core sample 18. For instance, as described above, the detector 22 may collect data indicative of radiation emitted from the core sample 18, as well as radiation from the radiation source 24 that is reflected off of the core sample 18.

At process block 132, the data analysis module 20 may analyze the data from the detector 22. For example, the data analysis module 20 may determine a density and an effective nuclear charge of material by utilizing the equation 192 and the equation 222. For instance, the number of counts for the Compton scattering region 170 of the core sample 18 (minus the number of counts for the Compton scattering region 170 from the inactive measurement) may be substituted as the value of x into the equation 192 to determine the density of the core sample 18. Moreover, the processing circuitry 32 may determine the ratio of the number of counts for the core sample 18 associated with the Compton scattering region 170 to the number of counts associated with a photoelectric absorption region 168. The processing circuitry 32 may substitute the determined value of the ratio into the equation 222 as x to provide the effective nuclear charge of the core sample 18. Additionally, the process 120, at process block 134, may include displaying the analyzed data. For example, the determinations made by the data analysis module 20 (e.g., via the processing circuitry 32 executing the application 38), such as the density and effective nuclear charge of the portion of the core sample 18 for which data was taken, may be displayed via the display 40 of the core sample analysis system 10. Moreover, the processing circuitry 32 may cause the analyzed data to be displayed via a display, such as the display 40 of the core sample analysis system 10.

As described in detail above, present embodiments include the core sample analysis system 10 having the detector module 14, the density module 12, and the data analysis module 20. The detector module 14 and density module 12 may be placed onto the skate 42, which enables the density module 12 and detector module 14 to move along the core barrel 16 that includes the core sample 18. The tab 90 in the density module 12 may be partially removed to enable radiation from the radiation source 24 within the density module 12 to reach the core sample 18. The detector 22 included within the detector module 14 may detect the radiation reflected off of and emitted from the core sample 18, and the processing circuitry 32 of the data analysis module 20 may determine a density and effective nuclear charge of the portion of the core sample 18 that is exposed to the radiation from the radiation source 24. Accordingly, the present embodiments enable a portable device that may be used to analyze core samples.

This written description uses examples to disclose the present embodiments, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A core sample analysis system, comprising:
a portable sampling device configured to be positioned adjacent to a subsurface core sample, wherein the portable sampling device comprises:
a first module comprising a channel, a radiation source disposed within the channel, and a tab, wherein the tab is at least partially removable from the first module to expose the subsurface core sample to radiation emitted from the radiation source; and
a second module attached to the first module and comprising a detector, wherein the detector is configured to detect the radiation emitted from the radiation source that is reflected off of the subsurface core sample.

2. The core sample analysis system of claim 1, wherein the radiation source is configured to emit gamma radiation.

3. The core sample analysis system of claim 1, wherein the second module further comprises a handle, wherein the portable sampling device is configured to be pushed or pulled along the subsurface core sample by a user of the portable sampling device via the handle.

4. The core sample analysis system of claim 3, wherein the second module further comprises a radiation-shielding material disposed within the second module that is configured to shield the detector from the radiation from the radiation source.

5. The core sample analysis system of claim 1, wherein the first module is removably coupled to the second module.

6. The core sample analysis system of claim 1, wherein the first module and the second module are adjacent to one another and are configured to be positioned adjacent to the subsurface core sample on a common side of the subsurface core sample.

7. The core sample analysis system of claim 1, wherein the second module further comprises an opening in a bottom face of the second module, wherein the detector is disposed within the second module such that the radiation reflected off of the subsurface core sample impinges onto the detector through the opening.

8. The core sample analysis system of claim 1, wherein the detector comprises a gamma-ray detector comprising a crystal, wherein the crystal is configured to receive the radiation reflected off of the subsurface core sample.

9. The core sample analysis system of claim 1, wherein the radiation source comprises cesium-137.

10. The core sample analysis system of claim 1, further comprising a data analysis module comprising a processing circuitry configured to:
receive data from the detector related to detected radiation; and
determine a density of a portion of the subsurface core sample, an effective nuclear charge associated with the portion of the subsurface core sample, or both.

11. The core sample analysis system of claim 1, wherein the first module further comprises a body consisting essentially of lead.

12. A portable apparatus, comprising:
a density module comprising a channel, a radiation source disposed within the channel, and a tab, wherein the tab is at least partially removable from the density module to expose a subsurface core sample to radiation emitted from the radiation source; and a detector module coupled to the density module, wherein the detector module comprises a detector, and wherein the detector is configured to detect the radiation emitted from the radiation source that is reflected off of the subsurface core sample.

13. The portable apparatus of claim 12, wherein the channel extends through an entire dimension of the density module with the tab partially removed from the density module.

14. The portable apparatus of claim 13, further comprising a plunger coupled to the radiation source and configured to extend into the channel, wherein the radiation source is configured to extend further towards the subsurface core sample with the tab partially removed from the density module.

15. A method for analyzing a subsurface core sample, the method comprising:
   positioning, on a side of a core barrel containing the subsurface core sample, a portable sampling device comprising a radiation source and a detector;
   emitting, via the radiation source disposed on the side of the core barrel, radiation into the subsurface core sample;
   collecting, via the detector disposed on the side of the core barrel, data indicative of radiation from the radiation source that is reflected off of the subsurface core sample; and
   analyzing, via a processing circuitry, the collected data.

16. The method of claim 15, further comprising calibrating a core sample analysis system comprising the portable sampling device prior to emitting radiation into the subsurface core sample.

17. The method of claim 15, wherein the portable sampling device comprises a skate, and wherein positioning the portable sampling device on the side of the core barrel comprises positioning the skate on the side of the core barrel.

18. The method of claim 15, wherein analyzing the collected data comprises determining, via the processing circuitry, a density of the subsurface core sample, an effective nuclear charge of the subsurface core sample, or both.

19. The method of claim 18, further comprising displaying, via a display communicatively coupled to the processing circuitry, the density of the subsurface core sample, the effective nuclear charge of the subsurface core sample, or both.

20. The method of claim 15, wherein the subsurface core sample comprises a subsurface sample that has been removed from a seabed or a subterranean source.

* * * * *